United States Patent Office 2,773,782
Patented Dec. 11, 1956

2,773,782

FELT SATURANTS AND METHOD OF MAKING THE SAME

Lloyd V. Hassel, East Hempfield Township, Lancaster County, and John A. Parker, Manor Township, Lancaster County, Pa., assignors to Armstrong Cork Company, Lancaster, Pa., a corporation of Pennsylvania No Drawing. Application August 11, 1953,
Serial No. 373,688

5 Claims. (Cl. 117—140)

This invention relates to felt saturants and method of making the same. More particularly, the invention relates to the production of heat-convertible alkyd resins of malenized tall oil fatty acids, which materials are particularly suitable for use as high-quality saturants for backing felt used in the manufacture of resilient hard surface floor coverings of the linoleum type.

In the manufacture of resilient hard surface floor coverings, including felt base floor coverings and floor coverings having a layer of linoleum or plastic composition carried by a felt base backing, it has been the general practice to saturate the base or foundation with asphalt to render it water resistant and to increase its strength. Asphalt is not particularly desirable for this purpose, since in the stoving or curing operation required to cure the facing layer, the asphalt frequently bleeds through into the surface layer. To obviate this undesirable property of the thermoplastic asphalt, it has been the practice to apply sealing coatings on both sides of the saturated foundation. Such coatings are designed to seal the asphalt within the felt backing. Such practice does not overcome the disadvantages resulting from the use of asphalt, for in many instances the asphalt bleeds through the seal coat when heat and pressure are applied in the manufacture of the covering; and in the stoving operation, the asphalt may seep through the uncoated edges of the foundation. In the manufacture of molded inlaid linoleum, for example, granulated linoleum composition has been placed on an asphalt-saturated felt base or foundation provided with sealing coating and disposed under a heated hydraulic press which serves to compact the granular composition and adhere it to the base. The coated carrier was then placed under a second heated hydraulic press and subjected to heat and pressure to smooth and secure a satisfactory face on the covering. Under the conditions of heat and pressure required for the operation, the asphalt saturant was softened and squeezed through the linoleum composition, staining the same. In many cases, the asphalt adhered to the press, thus rendering the covering difficultly removable and staining or discoloring other portions of the backing subsequently disposed in the press.

In the manufacture of calendered linoleum, a mass of linoleum mix is calendered onto a felt backing, thus subjecting the backing material to considerable strain and stress during the actual formation of the linoleum product.

With knowledge of the above disadvantages resulting from the use of asphalt-saturated backings in the production of resilient hard surface floor coverings, considerable research was undertaken with a view to improving the saturant employed in the production of saturated felt floor covering backing. This resulted in the use of oleoresinous type backings which are derived from preoxidized bodied drying oils. In some instances, the materials are oxidized in the presence of a resin, and in others the raw felt is saturated with a partially oxidized mixture of drying and/or semi-drying oil, such as a partially oxidized mixture of linseed oil, soya bean oil, and tall oil. The resulting saturated sheet is then cured by heating in air to impart thereto the characteristics required for a floor covering backing. Such materials have a rather high initial peak exotherm and require an extended period of cure at elevated temperature; for example, 20 hours at 195° F., to develop adequate physical properties in the saturated felt to make it useful for the manufacture of calendered linoleum. The physical requirements of the felt for molded operations are somewhat less. Immediately after saturation and before stove curing, the physical properties of oleoresinous saturated felt are not adequate, even for molded operations. Moreover, the existence of a high initial exotherm encountered with the oleoresinous saturant immediately after saturation presents a definite hazard in tightly rolled felt. It is, therefore, necessary to unroll and festoon this material shortly after saturation to prevent scorching and even combustion. Even if the oleoresinous saturant possessed adequate physical properties for processing immediately after saturation, such materials would still have to be unrolled and festooned to dissipate the internal heat developed. It is, therefore, necessary to cure this material for at least 20 hours to develop the necessary processing characteristics for calendering. The stoving of felt saturated with oleoresinous materials can be an extremely hazardous operation which may result in fires in the stoves.

We have found that in order to achieve the desired objective of a felt saturant which can be cured in a comparatively short period of time or even used in some instances without cure, there should be a viscosity temperature relationship which is very steep before heat conversion and, in addition, the materials should have no initial high exotherm. With such characteristics, namely the combination of a viscosity temperature relationship described above with the absence of initial peak exotherm, the felt may be saturated, rolled up, and employed directly in molding operations and further subjected to a controlled amount of cure without embrittlement during the subsequent stoving of the finished molded floor covering. Such materials can be used in calendering operations, which required more developed physical properties without the necessity of long periods of stoving as has heretofore been the case.

We have further found that a specially prepared alkyd resin composition possesses these desired properties; namely, (1) a reduction in initial peak exotherm; (2) a steep viscosity temperature function; and (3) characteristics of a rapid stove cure to a desired end point. We have further found that felts saturated with such an alkyd have, after final stoving of the goods, properties which are superior to felt saturated with the oleoresinous materials previously proposed to replace the asphalt saturants.

In accordance with our invention, a synthetic semi-drying oil is prepared by esterifying a mixture of aliphatic monobasic acids with a polyol or mixture of polyols having a functionality greater than 2. Generally speaking, we find it advantageous to utilize fatty acids derived from siccative oils, such as drying oils and/or semi-drying oils; for example, linseed oil acids, soya bean oil acids, and the like. A particularly desirable source of fatty acids for use in the preliminary stage of this phase of our invention is a material known as "Acintol No. 1," which consists of fatty acids derived from tall oil. The polyols or mixture of polyols used in the preliminary esterification may be glycerine, trimethylol ethane, trimethylol propane, pentaerythritol, dipentaerythritol, methyl glucoside, and the like, and/or mixtures of such materials. Generally speaking, from 5% to 10% excess of polyol is employed with an effective esterification catalyst, such as lead naphthenate. After esterification for about 6 to 8 hours at temperatures such as about 150° C to about 260° C., and advantageously in an inert atmosphere, a light-colored oil with an acid number value of about 6 to about 12 is obtained. Of course, the temperature of esterification will vary, depending, among other things, upon the time of reaction and the particular materials present in the reaction mixture. Generally speaking, we have found that no significant esterification occurs at temperatures below about 150° C., whereas if the temperature is permitted to rise above about 260° C., the viscosity of the reaction mass becomes too great due primarily to the bodying of the oil acids.

Following the production of the light-colored synthetic semi-drying oil as indicated above, the synthetic semi-drying oil may be reacted with any dicarboxylic acid capable of Diels-Alder reaction. Typical of such acids are alpha beta unsaturated dicarboxylic acids such as maleic, fumaric, glutaconic, itaconic, chloro-maleic, and the like. Of course, when available, anhydrides of the acids may be used. As used herein, the term "dicarboxylic acid" or its equivalent is intended to include the anhydrides. The resulting reaction product is then coesterified with a mixture of polyol having a functionality greater than 2 and dicarboxylic acid. Examples of such polyols have been given above and typical acids are phthalic acid, dilinoleic acid, and the like. Mixtures of acids and polyols may be used, if desired.

In an advantageous embodiment of our invention, following the production of the light-colored oil as indicated above, the synthetic semi-drying oil is then malenized by conventional procedures employing from 0.4 to 0.8 mole of maleic anhydride per mole of the synthetic semi-drying oil present in the mixture. The malenized product is then coesterified with a mixture of pentaerythritol and dilinoleic acid containing from 0.6 to 1.5 equivalents of pentaerythritol and from 0.2 to 0.6 equivalent of dilinoleic acid per molecule of malenized semi-drying oil.

In order to more fully illustrate the preparation of the saturant of our invention, reference may be had to the following specific examples:

EXAMPLE I 1166 parts by weight of tall oil fatty acids ("Acintol No. 1") were placed into a stainless steel alkyd kettle fitted with a propeller type stirrer, thermometer, inlet tube for inert gas, and a water trap-condenser arrangement for collecting water of reaction. The temperature was raised to 180° C. with stirring, and a mixture containing 149.6 parts by weight pentaerythritol and 10 parts by weight lead napthenate was added. Carbon dioxide was bubbled through the charge at a rate of 0.4 cubic foot per minute. The temperature was raised to 200° C. over a period of 15 minutes and then held at 200° C. until an acid number of 11.0 was obtained. The total hold time was 8½ hours. After raising the temperature to 220° C. over a period of 10 minutes, 63.8 parts by weight of maleic anhydride were added and the charge agitated at 220° C. for 2½ hours while bubbling $CO_2$ through the charge at a rate of .04 cubic foot per minute, after which time an acid number of 29.4 was attained. The batch was then cooled to 175° C. and 135.0 parts by weight of dimer acid (dilinoleic acid) were added, followed by 59.3 parts by weight of pentaerythritol. The batch was then held at 175° C. for 10 hours. The final acid number was 16.5 and the viscosity 5.3 seconds, or "O—P" Gardner-Holdt at 150° F.

EXAMPLE II

A 1740 g. (8 equivalents) sample of Arizona Chemical Acintol DLR, a tall oil containing approximately 20% rosin acids, was heated under a blanket of $CO_2$ with 6 g. of anthraquinone to 180° C. in a stainless steel alkyd kettle, fitted with a propeller type stirrer, inlet tube for inert gas, and a water trap and condenser. To this hot stirring mixture was added 319.5 g. (8 equivalents plus 10% excess) of alpha methyl glucoside. This addition was carried out gradually so that the temperature did not fall below 175° C., and an 8.7 g. sample of litharge was added and the inert gas flow increased to 0.4 liter per minute and the temperature held at 180–185° C. for one hour. Over the period of the next hour the temperature was raised to 205–210° C. and maintained at that temperature for two hours. During this time approximately 40–45 ml. of $H_2O$ were collected. The temperature was raised to 220–230° C. for the next three hours of the cook and an additional 25 ml. of distillate were obtained. The temperature was finally raised to 260° C. for the last two hours of the cook. After cooling, the methyl glucoside ester of Acintol DLR was obtained as an amber colored oil with an acid number of 6.0 and a rosin acid number of 23.3. The entire sample of the ester was heated to 220° C., and 98 g. (1.0 mol) maleic anhydride added slowly over a period of 15 minutes. The temperature was raised to 250° C. and maintained at that temperature for 2½ hours to complete the malenization. The malenized methyl glucoside ester of Acintol DLR was obtained as an amber colored oil with an acid number of 12.7 and a rosin acid number of 34.5. The entire sample of malenized ester was heated to 180° C. and 49.8 g. of phthalic anhydride added with good stirring followed by 69.0 g. of pentaerythritol. This mixture was cooked at 180° C. for two hours, followed by two hours at 200° C. The alkyd saturant was obtained as a very viscous amber liquid with an acid number of 22.8 and rosin acid number of 37.5. This saturant had a viscosity from 3000 cps. to 160 cps. at saturation temperatures of 150° F. to 250° F.

Alkyds prepared in accordance with our invention may be employed to saturate gray felt for use as a linoleum or similar hard surface floor covering backing using a roller coater at temperatures of 180° to 200° F. Generally speaking, we have obtained advantageous results with a 33% to 43% pick-up of the saturant on the weight of the felt. If it is intended to stove the melt immediately after saturation, driers such as cobalt tallate and lead naphthenate may be used provided suitable precautions are taken to dissipate the heat of reaction. However, in a particularly advantageous embodiment of our invention, no driers are used as no high peak exotherm is encountered, and the alkyd reaches the same or better physical properties in one-third of the time required for oleoresinous saturants. The choice of methods of handling the saturated felt may vary, depending upon the production cycle and capacity desired. If the material is to be used for a calendering operation, it can be stoved for one third the time required for an oleoresinous material. With driers, saturated felt with tensile strengths of 2200 to 2400 may be prepared 14 times as fast as the oleoresinous saturants.

The saturation of a felt with the alkyd saturant of our invention is described in the following specific example:

EXAMPLE III

A saturant prepared in accordance with Example I was roller coated onto gray felt at a temperature of 180° to 200° F. and a pick-up of 36% saturant was obtained based on the weight of the felt. Prior to saturation, 0.05% cobalt metal and 0.5% lead metal based on saturant weight were added. These driers were 4% cobalt tallate and 24% lead naphthenate. An oleoresinous saturant obtained by oxidizing a mixture containing linseed oil, soya bean oil, and tall oil was used to saturate felt at the same time to serve as a control.

Table
ALKYD SATURANT vs. OLEORESINOUS FELT SATURANT

| Saturant | Percent Saturant | Cure Cycle | Accelerated Aging Cycle | Average Lbs. Pull at Break | Average Percent Elongation at Break | Average Olsen Stiffness | Average Bend Break Angle, degrees |
|---|---|---|---|---|---|---|---|
| Oleoresinous | 36.7 | 20 hrs. at 195° F | | 78 | 2.5 | 17 | 31 |
| Do | 38.2 | ___do___ | 4 days at 195° F | 132 | 3.9 | 28 | 38 |
| Do | 36.3 | ___do___ | 16 hrs. at 250° F | 137 | 3.9 | 28 | 45 |
| Alkyd of Invention [1] | 37.0 | 6 hrs. at 195° F | | 79 | 2.2 | 18 | 25 |
| Do | 36.6 | ___do___ | 4 days at 195° F | 141 | 4.2 | 27 | 47 |
| Do | 37.6 | ___do___ | 16 hrs. at 250° F | 153 | 4.3 | 29 | 68 |

[1] No driers.

The table indicates, among other things, that highly desirable properties can be obtained with cure-times less than one third of the cure time required for oleoresinous saturants.

Several sheets were saturated and stacked at room temperature with a thermocouple in the center of the stack. The temperature of the pile was recorded over a period of several hours. In the pile there was no heat build-up noticeable.

As can be seen from the above, we have provided a new saturant for felt for use in the backing of linoleum and similar hard surface floor coverings. This saturant is free from many of the disadvantages which result from the thermoplastic nature of asphalt. For example, there is no staining nor bleeding during manufacturing, handling, and installation operations. In addition, the saturant is free from many of the disadvantages inherent in oleoresinous-type saturants which have been designed to overcome the disadvantages of the asphalt saturant. The materials are not subject to the requirements of long stoving times, such as is the case with the conventional oleoresinous saturants. The hazards of stoving oleoresinous materials are eliminated, and the saturated felts possess superior properties.

Although we have particularly described our invention with reference to floor covering backings, it is also within the scope of our invention to utilize the products of our invention in the manufacture of wall coverings.

We claim:

1. A method of making a saturant for felt for use in floor covering backing, comprising heating tall oil acids in the presence of about 5% to about 10% excess of at least one polyol having a functionality greater than 2 solely from hydroxyl groups for a period of about six to eight hours at a temperature of about 150° C. to about 260° C. to esterify said acid, heating the resulting material in the presence of 0.4 to 0.8 mole of maleic anhydride per mole of ester to malenize said ester, and heating said malenized product in the presence of a mixture containing 0.6 to 1.5 equivalent of pentaerythritol and from 0.2 to 0.6 equivalent of dilinoleic acid per equivalent of malenized oil.

2. A saturant for felt for use as floor covering backing material, said saturant comprising the product obtained by heating siccative oil acid in the presence of about 5% to about 10% excess of at least one polyol having a functionality greater than 2 solely from hydroxyl groups to esterify said acids, heating the resulting material in the presence of 0.4 to 0.8 mole of an alpha, beta, olefinically unsaturated dicarboxylic acid, and heating resulting acid-reacted product in the presence of a mixture containing 0.6 to 1.5 equivalent of polyhydric alcohol having a functionality of at least 3 solely from hydroxyl groups and from 0.2 to 0.6 equivalent of a dicarboxylic acid selected from the group consisting of phthalic anhydride and dilinoleic acid per equivalent of said acid reaction product.

3. A saturant for felt for use as a floor covering backing material, said saturant comprising the product obtained by esterifying substantially equal molecular proportions of tall oil acids with pentaerythritol, malenizing the resulting product with maleic anhydride in an amount of 0.4 to 0.8 mole of maleic anhydride per mole of said ester, and coesterifying said malenized product with a mixture containing 0.6 to 1.5 equivalent of pentaerythritol and from 0.2 to 0.6 equivalent of dilinoleic acid per equivalent of said malenized product.

4. A waterproof felt adapted for use as a floor covering backing comprising felt saturated with the product obtained by heating siccative oil acids in the presence of about 5% to about 10% excess of at least one polyol having a functionality greater than 2 solely from hydroxyl groups to esterify said acids, heating the resulting material in the presence of 0.4 to 0.8 mole of an alpha, beta, olefinically unsaturated dicarboxylic acid per mole of ester, and heating said acid reaction product in the presence of a mixture containing 0.6 to 1.5 equivalent of a polyhydric alcohol having a functionality of at least 3 solely from hydroxyl groups and 0.2 to 0.6 equivalent of a dicarboxylic acid selected from the group consisting of phthalic anhydride and dilinoleic acid per equivalent of said acid reaction product.

5. A waterproof felt according to claim 4 wherein said siccative oil acids comprise tall oil acids, said polyol having a functionality greater than 2 comprises pentaerythritol, said unsaturated dicarboxylic acid comprises maleic anhydride, said polyhydric alcohol having a functionality of at least 3 comprises pentaerythritol, and said dicarboxylic acid comprises dilinoleic acid.

References Cited in the file of this patent

UNITED STATES PATENTS

| | | |
|---|---|---|
| 1,960,220 | Hopkins | May 22, 1934 |
| 2,033,132 | Ellis | Mar. 10, 1936 |
| 2,337,920 | Patterson et al. | Dec. 28, 1943 |
| 2,527,057 | Canfield | Oct. 24, 1950 |
| 2,637,707 | Marling et al. | May 5, 1953 |
| 2,637,708 | Marling et al. | May 5, 1953 |

OTHER REFERENCES

Goldsmith, Ind. and Eng. Chem. July 1948, pp. 1205–1211.

Official Digest, No. 251, pp. 490–92, December 1945.